2,817,671
16-CYANO AND 16-CYANOALKYL 3,20-DIOXYGENATED PREGNENES

Robert H. Mazur, Evanston, Ill., assignor to G. D. Searle & Co., Chicago, Ill., a corporation of Delaware No Drawing. Application March 20, 1956
Serial No. 572,629

5 Claims. (Cl. 260—397.3)

This invention relates to 16-cyano and 16-cyanoalkyl derivatives of 3,20-dioxygenated pregnenes, and processes for the manufacture thereof. More particularly, this invention relates to pregnenes of the formula

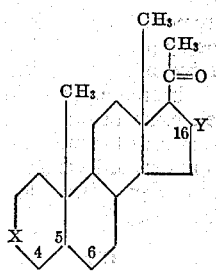

wherein X is either a hydroxymethylene or a carbonyl radical; the 16-substituent, Y, is either a cyano or a cyanoalkyl radical; and the carbon atom in position number 5 is doubly bonded to either of the carbons at 4 and 6.

When X in the foregoing generic formula is hydroxymethylene

>CHOH the characteristic double bond is ordinarily disposed between carbons 5 and 6. On the other hand, when X represents carbonyl

>C=O the double bond is commonly conjugated—i. e., in the 4-position.

As to the cyanoalkyl radicals comprehended by Y in the generic formula, these are preferably lower alkyl radicals—such as methyl, ethyl, propyl, isopropyl, butyl, isobutyl, secondary butyl, tertiary butyl, pentyl, secondary normal pentyl, primary isopentyl, secondary isopentyl, tertiary pentyl, and sundry hexyl, heptyl, and octyl radicals—substituted in each instance by a single cyano radical.

The compounds of this invention possess valuable pharmacological properties. Especially, the subject compounds are useful because of their selective anti-cortisone activity. Administered conjointly with cortisone, they block the atrophying influence thereof on lymph nodes and thymus, and appear to inhibit—in particular species—cortisone-induced susceptibility to disease, without impairing the curative effects of this valued medicament.

The compounds hereinafter claimed are relatively insoluble in water but may be dissolved in aqueous alcohols and most of the common (anhydrous) organic solvents. The subject compounds may be administered in solid form as tablets or capsules; dissolved or suspended in aqueous media, they may be given parenterally.

A variety of methods serve for manufacture of the disclosed compounds, the method of choice in a given instance depending upon the structure of the product sought. Thus, the 16-cyano compounds of my discovery are prepared from an appropriate 16-dehydropregnenolone—for example, 3-hydroxypregna-5,16-dien-20-one—which is esterified to protect the hydroxyl group, then converted to a 16-cyano derivative by interaction at elevated temperatures in a solvent medium with hydrogen cyanide or a salt thereof—for example, potassium cyanide. Where saponification is not achieved in process, this is effected by subsequent treatment with alkali. The 16-cyano-3-hydroxy compound thus produced—one of the compounds defined by the claims hereinafter—is converted to the corresponding 3-oxo compound of the claims by Oppenauer oxidation—for example, with aluminum isopropoxide and cyclohexanone in toluene.

Where a 16-cyanomethylpregnenolone is the target product, preparation is via the ethyl cyanoacetate adduct of a suitable 16-dehydropregnenolone ester—for example, 3-acetoxypregna-5,16-dien-20-one—said adduct being derived in absolute alcohol solution, using metallic sodium or sodium ethoxide as a condensing agent. Saponification of the ester adduct, followed by a short heating period at around 300° centigrade to bring about decarboxylation, affords the desired 16-cyanomethyl-3-hydroxy compound. This material—another of the hereinafter claimed compounds—is, like the homologous 16-cyano material aforesaid, converted to the corresponding 3-oxo compound of the claims by Oppenauer oxidation.

The following examples describe in detail certain of the compounds illustrative of the present invention, and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted. Specific rotations refer to the D line of sodium and were determined in methyl alcohol solution at room temperature.

Example 1

*16α-cyano-3β-hydroxypregn-5-en-20-one.*—A suspension of 20 parts of 3β-acetoxypregna-5,16-dien-20-one and 20 parts of potassium cyanide in a mixture of 315 parts of methyl alcohol, 36 parts of ethyl acetate, and 40 parts of water, is heated at reflux temperatures for 2 hours. A clear solution results. Introduction of 500 parts of water and cooling causes precipitation of 16α-cyano-3β-hydroxypregn-5-en-20-one, which is separated by filtration. The product is crystallized by dissolution in a mixture consisting of three volumes of methyl alcohol and 40 volumes of benzene, followed by concentration of the resultant solution to approximately 25 volumes. The cyano steroid comes down as clustered needles, M. P. 225–228° C., specific rotation +23°. It has the formula

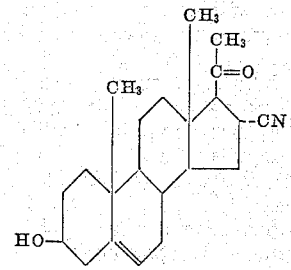

Example 2

*16α-cyanopregn-4-ene-3,20-dione.*—A solution of 22 parts of 16α-cyano-3β-hydroxypregn-5-en-20-one in a mixture of 870 parts of toluene and 209 parts of cyclohexanone is azeotropically dried by brief distillation. A solution of 44 parts of aluminum isopropoxide in 190 parts of dry toluene is then introduced, following which the reactants are heated at reflux temperatures for 3 hours and then diluted with 1500 parts of 50% aqueous Rochelle salt solution. Cyclohexanone is removed by steam distillation, whereupon the distilland—which contains the desired 16α-cyano-3β-hydroxypregn-5-en-20-one as a precipitate—is cooled and filtered. The dried precipitate is crystallized from aqueous methyl alcohol as prisms, M. P. 230–233° C., specific rotation +151°. The product so obtained has the formula

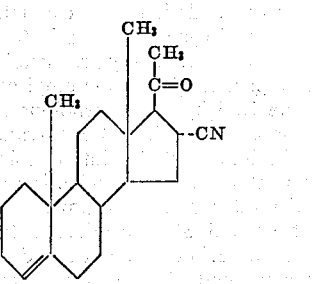

*Example 3*

*Ethyl 3β - hydroxy - 20 - oxopregn - 5 - en-16α-cyano-acetate.*—To a solution of 14 parts of sodium and 68 parts of ethyl cyano-acetate in 800 parts of absolute alcohol is added 107 parts of 3β-acetoxypregna-5,16-dien-20-one. The mixture is agitated at room temperature until the steroid is dissolved—about one and one-half hours ordinarily being required—and the resultant solution then let stand at room temperatures overnight sans further agitation. The solution is next neutralized with acetic acid, following which it is concentrated under reduced pressure. Excess ethyl cyanoacetate is finally pumped off under high vacuum. The residue is chromatographed on silica gel. Elution with 20% ethyl acetate in benzene affords the desired ethyl 3β-hydroxy-20-oxopregn-5-en-16α-cyanoacetate which, crystallized from ethyl acetate, is obtained as short needles, M. P. 196–198° C. The product has the formula

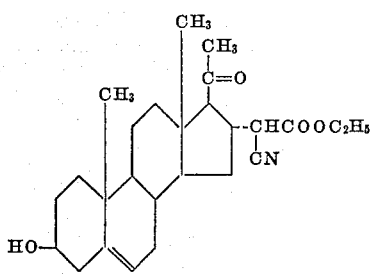

*Example 4*

*16α-cyanomethyl-3β-hydroxypregn-5-en-20-one.*—A solution of 64 parts of the ethyl cyanoacetate adduct obtainable by the procedure of the foregoing Example 3 in 650 parts of dioxane, is diluted with 195 parts of water containing, in solution, approximately 10 parts of caustic potash. The reactants are heated under gentle reflux for one-half hour, then neutralized with acetic acid and diluted with 200 parts of water. Concentration under reduced pressure results in precipitation of the deesterified adduct, which is isolated by extraction into chloroform. The chloroform extract is stripped of solvent and the residue thereupon decarboxylated by heating at 280–300° C. for three-quarters of an hour. Crystallization of the product thus obtained from ethyl acetate affords 16α-cyanomethyl-3β-hydroxypregn-5-en-20-one as tiny needles, M. P. 206–207° C. The product has the formula

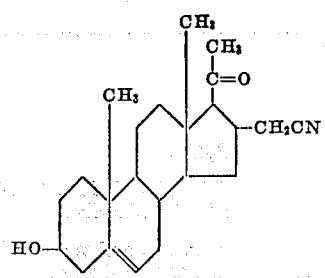

*Example 5*

*16α - cyanomethylpregn-4-ene-3,20-dione.*—A solution of 52 parts of 16α-cyanomethyl-3β-hydroxypregn-5-en-20-one in 1740 parts of toluene is azeotropically dried by brief distillation. There is then added 235 parts of cyclohexanone and a solution of 53 parts of aluminum isopropoxide in 220 parts of dry toluene. The resultant mixture is heated at reflux temperatures, with agitation, for 2 hours. Approximately 3000 parts of 50% aqueous Rochelle salt solution is next introduced, whereupon cyclohexanone is removed by steam distillation. The desired 16α-cyanomethylpregn-4-ene-3,20-dione is isolated from the distilland by extraction with ether. Evaporation of solvent and chromatographic purification of the residue on silica gel, using benzene and ethyl acetate as developing solvents, affords the purified product, which—crystallized from a mixture of benzene and cyclohexane—is obtained as rectangular prisms, M. P. 185–186° C. The product has the formula

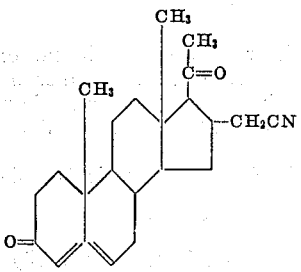

What is claimed is:
1. A compound of the formula

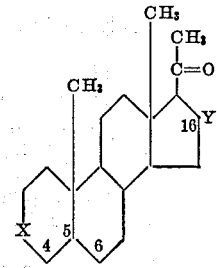

wherein X is selected from the group consisting of the hydroxymethylene radical and the carbonyl radical; the 16-substituent, Y, is selected from the group consisting of the cyano radical and the cyanomethyl radical; and the carbon atom in position number 5 is doubly bonded to the carbon atom in position 6 when X is hydroxymethylene, and to the carbon atom in position 4 when X is carbonyl.

2. 16α-cyano-3β-hydroxypregn-5-en-20-one.
3. 16α-cyanopregn-4-ene-3,-20-dione.
4. 16α-cyanomethyl-3β-hydroxypregn-5-en-20-one.
5. 16α-cyanomethylpregn-4-ene-3,20-dione.

References Cited in the file of this patent

UNITED STATES PATENTS

| | | |
|---|---|---|
| 2,697,109 | Dodson | Dec. 14, 1954 |
| 2,708,201 | Dodson et al. | May 10, 1955 |

UNITED STATES PATENT OFFICE
Certificate of Correction

Patent No. 2,817,671 December 24, 1957

Robert H. Mazur

It is hereby certified that error appears in the printed specification of the above numbered patent requiring correction and that the said Letters Patent should read as corrected below.

Column 4, Example 5, the formula should appear as shown below instead of as in the patent—

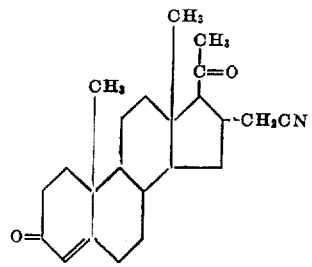

same column 4, line 67, claim 3, for "16α-cyanopregn-4-ene-3,-20-dione" read —16α-cyanopregn-4-ene-3,20-dione—.

Signed and sealed this 25th day of March 1958.

[SEAL]

Attest:
KARL H. AXLINE,
*Attesting Officer.*

ROBERT C. WATSON,
*Commissioner of Patents.*